United States Patent
Aoyama et al.

(10) Patent No.: US 7,670,241 B2
(45) Date of Patent: Mar. 2, 2010

(54) CONTINUOUSLY VARIABLE TRANSMISSION METAL BELT, PROCESS FOR PRODUCING METAL RING, AND PROCESS FOR MEASURING SHAPE OF METAL RING

(75) Inventors: Hideaki Aoyama, Saitama (JP); Toru Yagasaki, Saitama (JP); Manabu Murakami, Saitama (JP); Shigeru Kanehara, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1063 days.

(21) Appl. No.: 11/019,385

(22) Filed: Dec. 23, 2004

(65) Prior Publication Data

US 2005/0170926 A1 Aug. 4, 2005

(30) Foreign Application Priority Data

Dec. 26, 2003 (JP) ............................. 2003-434282

(51) Int. Cl.
*F16G 5/16* (2006.01)
(52) U.S. Cl. ....................................... 474/242; 474/201
(58) Field of Classification Search ............... 474/201, 474/242
See application file for complete search history.

(56) References Cited

U.S. PATENT DOCUMENTS 4,661,089 A 4/1987 Cuypers 6,217,471 B1 * 4/2001 Brandsma et al. ........... 474/242
2003/0226765 A1 * 12/2003 Van Oirschot et al. ...... 205/672

FOREIGN PATENT DOCUMENTS

| EP | 0 950 830 A1 | 10/1999 |
| EP | 1 130 282 A1 | 9/2001 |
| JP | 61-290257 | 12/1986 |
| JP | 61-290257 A | 12/1986 |
| JP | 6-6970 | 1/1994 |
| JP | 7-43119 A | 2/1995 |
| JP | 2001-241512 A | 9/2001 |
| JP | 2001-317594 A | 11/2001 |
| WO | 2004/069473 A1 | 8/2004 |

* cited by examiner

*Primary Examiner*—Richard W L Ridley
*Assistant Examiner*—Terence Boes
(74) *Attorney, Agent, or Firm*—Arent Fox LLP

(57) ABSTRACT

In a continuously variable transmission metal belt, a lateralmost projecting portion of a side edge of a metal ring assembly wherein each metal ring is located between a radially central plane and a radially inner peripheral surface of the metal ring. A contact point in which the projecting portion abuts against a V-face of a pulley is closer to the radially central plane than to the radially inner peripheral surface. Moreover, as the metal rings are laminated on one another, recesses are formed between the side edges of the adjacent metal rings to retain oil therein, which lubricates the sliding faces of adjacent metal rings and enhances durability of the assembly.

4 Claims, 8 Drawing Sheets

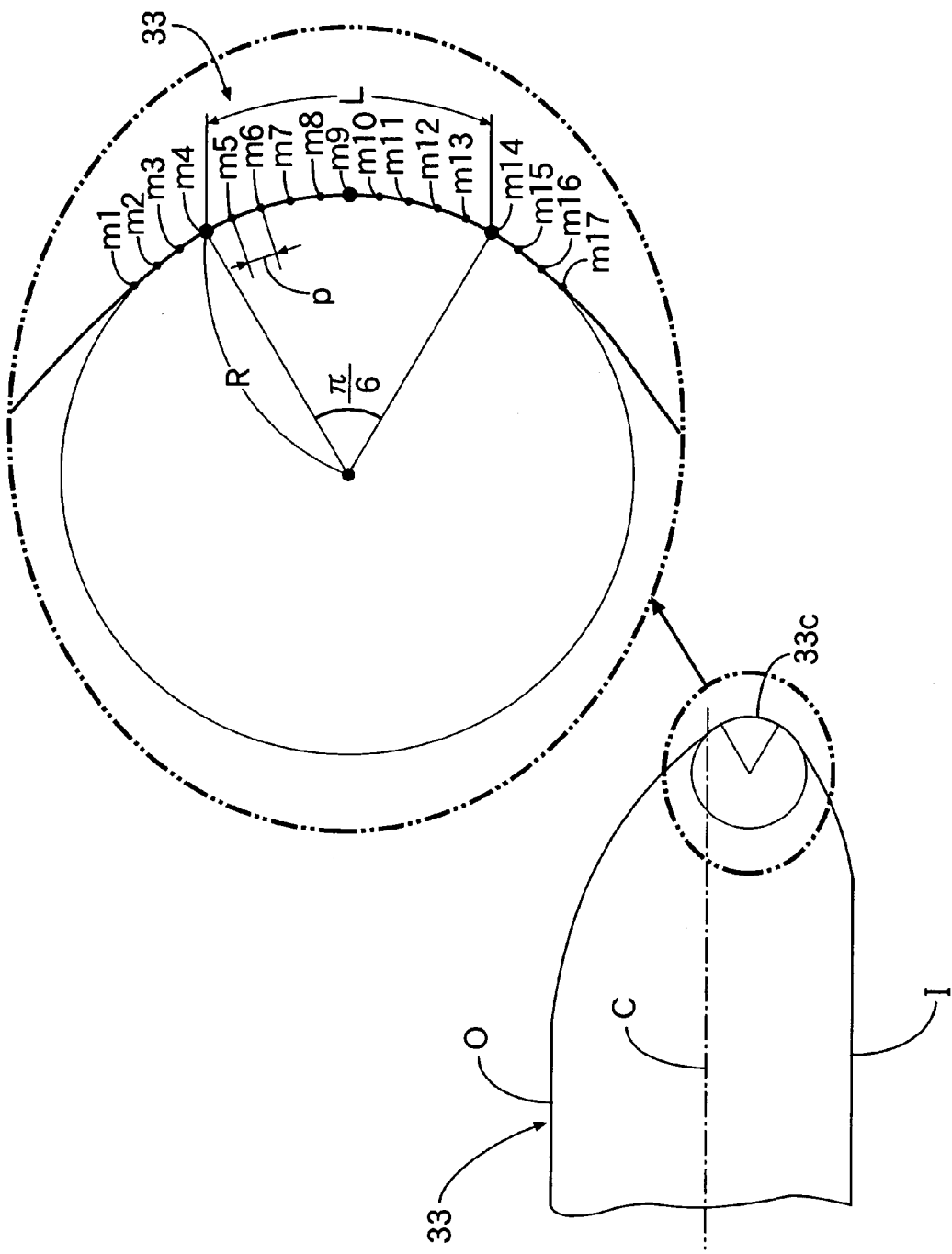

CONTINUOUSLY VARIABLE TRANSMISSION METAL BELT, PROCESS FOR PRODUCING METAL RING, AND PROCESS FOR MEASURING SHAPE OF METAL RING

RELATED APPLICATION DATA

The Japanese priority application No. 2003-434282 upon which the present application is based is hereby incorporated in its entirety herein by reference.

BACKGROUND OF THE INVENTION

1. Field of the Invention

The present invention relates to a continuously variable transmission metal belt comprising a metal ring assembly including a plurality of endless metal rings laminated on one another and a plurality of metal elements supported on the metal ring assembly; a process for producing the metal ring; and a process for measuring the shape of the metal ring.

2. Description of the Related Art

Japanese Patent Publication No. 6-6970 discloses a metal ring of a continuously variable transmission metal belt, wherein a portion near a side edge of the metal ring is plastically deformed so that a thickness of the portion gradually decreases in a laterally outward direction of the metal ring. Accordingly, due to bending of the metal belt, a compression stress and a tensile stress on the side edge of the metal ring decrease, which extends the fatigue life of the side edge of the metal ring.

In the conventional metal ring, the fatigue life of the side edge of the metal ring is determined based on a bending stress. However, no consideration of a Hertz stress is taken when determining the fatigue life of the side edge of the metal ring. The Hertz stress, being due to contact between a V-face of a pulley and a neck portion of a metal element, causes the side edge of the metal ring to be a starting point of a fatigue fracture. Therefore, it is difficult to effectively extend the fatigue life of the side edge of the metal ring.

SUMMARY OF THE INVENTION

Accordingly, it is an aspect of the present invention to effectively extend the fatigue life of a side edge of a metal ring of a continuously variable transmission metal belt.

To achieve the above, and other aspects, the present invention provides a continuously variable transmission metal belt including a metal ring assembly having a plurality of endless metal rings laminated on one another and a plurality of metal elements supported on the metal ring assembly. A lateral-most projecting portion of a side edge of each metal ring is located between a radially central plane and a radially inner peripheral surface of the metal ring.

With the above-described structural arrangement of the invention, the lateral-most projecting portion of the side edge of the metal ring is located between the radially central plane and the radially inner peripheral surface of the metal ring. Therefore, the position in which the projecting portion abuts against a V-face of a pulley is closer to the radially central plane than to the radially inner peripheral surface of the metal ring. Accordingly, a total amount of a compression stress, which is due to the bending force applied to the metal rings wound around the pulley, and a Hertz stress, which is generated by the contact of the projecting portion with the V-face of the pulley, decreases and the fatigue life of the side edge of the metal ring is enhanced. Further, as the metal rings are laminated on one another, recesses formed between the side edges of adjacent metal rings are able to retain oil therein, which effectively lubricates the sliding faces of the adjacent metal rings and further enhances the durability of the metal rings. Furthermore, a wider radially inner peripheral surface of an overlying metal ring covers a relatively narrower radially outer peripheral surface of the underlying metal ring, which further enhances a centering function, by crowning, of the metal ring assembly.

The present invention also provides a process for producing a metal ring for a continuously variable transmission metal belt, wherein the side edge of the metal ring is cut by a pushing/cutting method and then polished, wherein the projecting portion of the side edge of the metal ring is formed to have a predetermined radius.

With the steps of the above-described process, the side edge of the metal ring is cut by the pushing/cutting method and then polished, which provides the projecting portion of the side edge of the metal ring with a predetermined radius. Therefore, a metal ring having a side edge with a desired shape is produced with good efficiency and good accuracy.

The present invention also provides a process for measuring a shape of a metal ring for a continuously variable transmission metal belt by calculating a radius of the projecting portion of the metal ring, the process including the steps of measuring a sectional shape of the side edge of the metal ring as coordinates of a plurality of measurement points spaced apart from each other at predetermined intervals; calculating moving averages of the coordinates of the consecutive measurement points; and selecting at least three of the moving averages at predetermined intervals to calculate a radius of the projecting portion from the at least three moving averages.

With the steps of the above-described process, the sectional shape of the side edge of each metal ring is measured as the coordinates of the plurality of measurement points spaced apart at the predetermined intervals; the moving averages of the coordinates of the consecutive measurement points are calculated; at least three of the moving averages at predetermined intervals are selected; and the radius of the projecting portion is calculated from the at least three moving average. Therefore, errors in detecting the coordinates of the measurement points are eliminated, as is any influence fine flaws on the projecting portion of the metal ring may have on calculations, thereby determining the radius of the projecting portion with improved accuracy.

The above, and other aspects, features and advantages of the invention will become apparent from the following description of the preferred embodiment taken in conjunction with the accompanying drawings.

BRIEF DESCRIPTION OF THE DRAWINGS

FIG. 8 is a perspective view of a metal ring illustrating a technique of measuring a radius of a projecting portion of the metal ring along with an enlarged portion of the metal ring.

DESCRIPTION OF THE PREFERRED EMBODIMENT

The present invention will now be described by way of an embodiment shown in the accompanying drawings.

Figure 2:
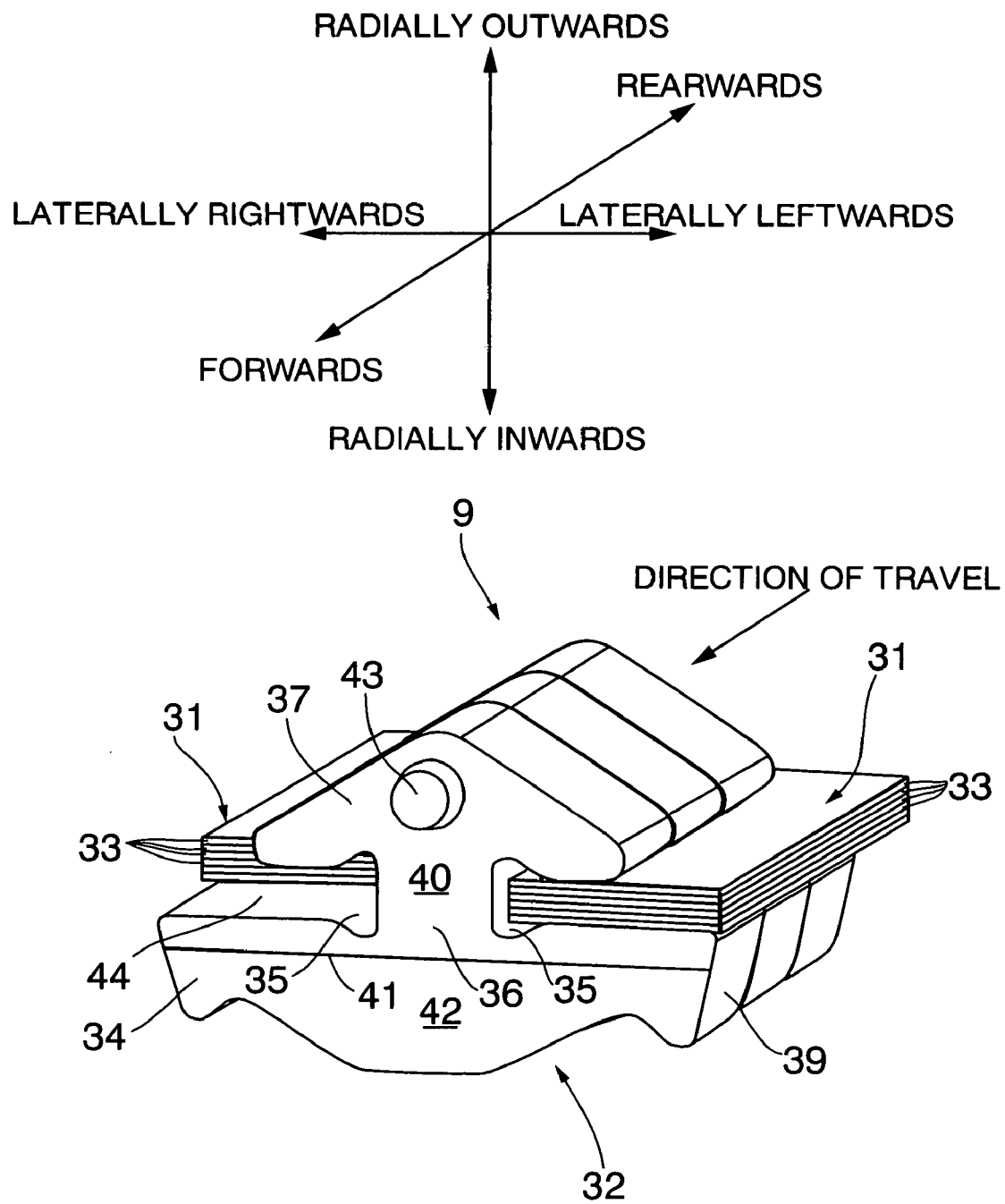
FIG. 2 is a partial perspective view of a metal belt.

The forward and rearward directions, the left and right directions, and the radial direction of the metal elements used in the present invention are defined as shown in FIG. 2. The radial direction is defined as the radial direction of a pulley with which the metal element is in contact. The side closer to the shaft of the pulley is the radially inner side and the side further from the shaft of the pulley is the radially outer side. The lateral direction of the metal element is defined as the direction along the rotational axis of the pulley with which the metal element is in contact. The forward and rearward directions are defined as the directions along the traveling direction of the metal element when the vehicle travels forward.

Figure 1:
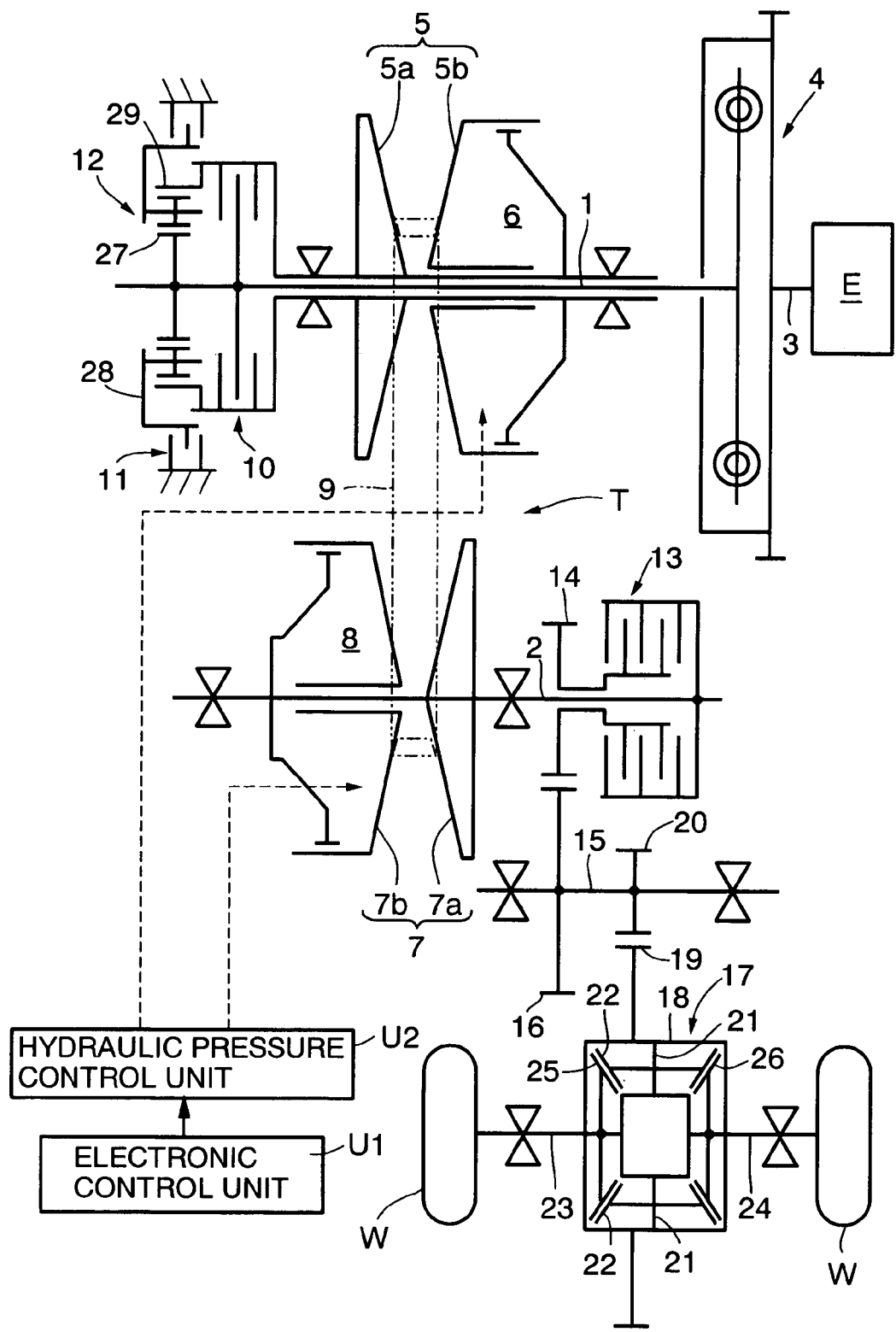
FIG. 1 is a schematic diagram of a power transmission system of a vehicle having a metal belt type continuously variable transmission.

As shown in FIG. 1, a metal belt type continuously variable transmission T for a vehicle includes a driving shaft 1 and a driven shaft 2, which are disposed parallel to each other. A crankshaft 3 of an engine E is connected to the driving shaft 1 through a damper 4.

A driving pulley 5, supported on the driving shaft 1, includes a stationary pulley half 5a rotatable relative to the driving shaft 1, and a movable pulley half 5b axially slidable relative to the stationary pulley half 5a. A groove width between the movable pulley half 5b and the stationary pulley half 5a is variable by a hydraulic pressure applied to a working oil chamber 6. A driven pulley 7, supported on the driven shaft 2, includes a stationary pulley half 7a integrally formed on the driven shaft 2 and a movable pulley half 7b axially slidable relative to the stationary pulley half 7a. A groove width between the movable pulley half 7b and the stationary pulley half 7a is variable by a hydraulic pressure applied to a working oil chamber 8. A metal belt 9 including two metal ring assemblies, each metal ring assembly including a relatively large number of metal elements, is wound between the driving pulley 5 and the driven pulley 7.

A forward and rearward travel switching mechanism 12 including a single pinion type planetary gear mechanism is mounted at a left end of the driving shaft 1. The forward and rearward travel switching mechanism 12 includes a forward clutch 10, which engages the driving shaft 1 when establishing a forward gear stage to transmit the rotation of the driving shaft 1 in the same direction to the driving shaft 5, and a reverse brake 11, which engages the driving shaft 1 when establishing a rearward gear stage to transmit the rotation of the driving shaft 1 in the opposite direction to the driving shaft 5. In the forward and rearward travel switching mechanism 12, a sun gear 27 is fixed to the driving shaft 1; a planetary carrier 28 is restrained to a casing by the reverse brake 11; and a ring gear 29 is coupled to the driving pulley 5 by the forward clutch 10.

A starting clutch 13 mounted at a right end of the driven shaft 2 connects a first intermediate gear 14 relatively rotatably carried on the driven shaft 2 to the driven shaft 2. A second intermediate gear 16 is provided on an intermediate shaft 15 disposed in parallel to the driven shaft 2 and is meshed with the first intermediate gear 14. A third intermediate gear 20 is provided on the intermediate shaft 15 and meshed with an input gear 19 provided in a gear box 18 of a differential gear 17. A pair of pinions 22, 22 is carried in the gear box 18 through pinion shafts 21, 21. Side gears 25 and 26, provided at axial ends of a left axle 23 and a right axle 24, are relatively rotatably carried in the gear box 18 and are meshed with the pair of pinions 22, 22. Driven wheels W, W are connected to the axial ends of the left axle 23 and the right axle 24, respectively.

Thus, when a forward range is selected by a selecting lever, the forward clutch is first brought into an engaged state by a command from a hydraulic pressure control unit U2 operated by an electronic control unit U1. Thus, the driving shaft 1 is integrally coupled to the driving pulley 5. Then, the starting clutch is brought into an engaged state wherein a torque of the engine E is transmitted through the driving shaft 1, the driven shaft 5, the metal belt 9, the driven pulley 7, the driven shaft 2 and the differential gear 17 to the driven wheels W, W, wherein the vehicle starts moving forward. When a reverse range is selected by the selecting lever, the reverse brake 11 is brought into an engaged state by a command from the hydraulic pressure control unit U2, wherein the driving pulley 5 is driven in a direction opposite from the direction of rotation of the driving shaft 1. Therefore, the vehicle starts moving rearward via the engagement of the starting clutch 13.

When the vehicle is started in this manner, the hydraulic pressure supplied to the working oil chamber 6 in the driving pulley 5 is increased by the command from the hydraulic pressure control unit U2, wherein the movable pulley half 5b of the driving pulley 5 is moved toward the stationary pulley half 5a and an effective radius increases. At the same time, the hydraulic pressure supplied to the working oil chamber 8 in the driven pulley 7 is decreased, wherein the movable pulley half 7b of the driven pulley 7 is moved away from the stationary pulley half 7a and the effective radius decreases. Thus, the ratio of the metal belt type continuously variable transmission T is continuously varied from a LOW side toward an OD side.

As shown in FIG. 2, the metal belt 9 includes a pair of left and right metal ring assemblies 31, 31 and a relatively large number of metal elements 32 supported on the metal ring assemblies 31, 31. That is, each metal ring assembly 31 is formed of a plurality of metal rings 33 laminated on one another. Each metal element 32 is formed by punching out a metal sheet and includes an element main body 34, a neck portion 36 positioned between a pair of left and right ring slots 35 into which the metal ring assemblies 31 are fitted, and a substantially triangular ear portion 37 connected to a radially outer side of the element main body 34 via the neck portion 36. Formed on opposite ends in the left and right direction of the element main body 34 is a pair of pulley abutment surfaces 39 that abuts V-faces 38 (see FIG. 5) of the drive pulley 5 and driven pulley 7. Main surfaces 40 are formed on the forward side and rear side in the traveling direction of the metal elements 32. The main surfaces 40 abut the main surfaces 40 of adjacent metal elements 32. An inclined surface 42 is formed in a lower part of the main surface 40 on the forward side in the traveling direction via a rocking edge 41 extending in the left and right direction. Furthermore, in order to join metal elements 32 that are adjacent to each other in the traveling direction, projections 43f and recesses 43r are formed on the front and rear surfaces of the ear portions 37 wherein the projection 43f and the recess 43r mate with each other. Formed on lower edges of the left and right ring slots 35 are saddle faces 44 to support the inner peripheral surfaces of the metal ring assemblies 31.

A process for producing the metal ring 33 forming the metal ring assembly 31 will be described below.

Figure 3:
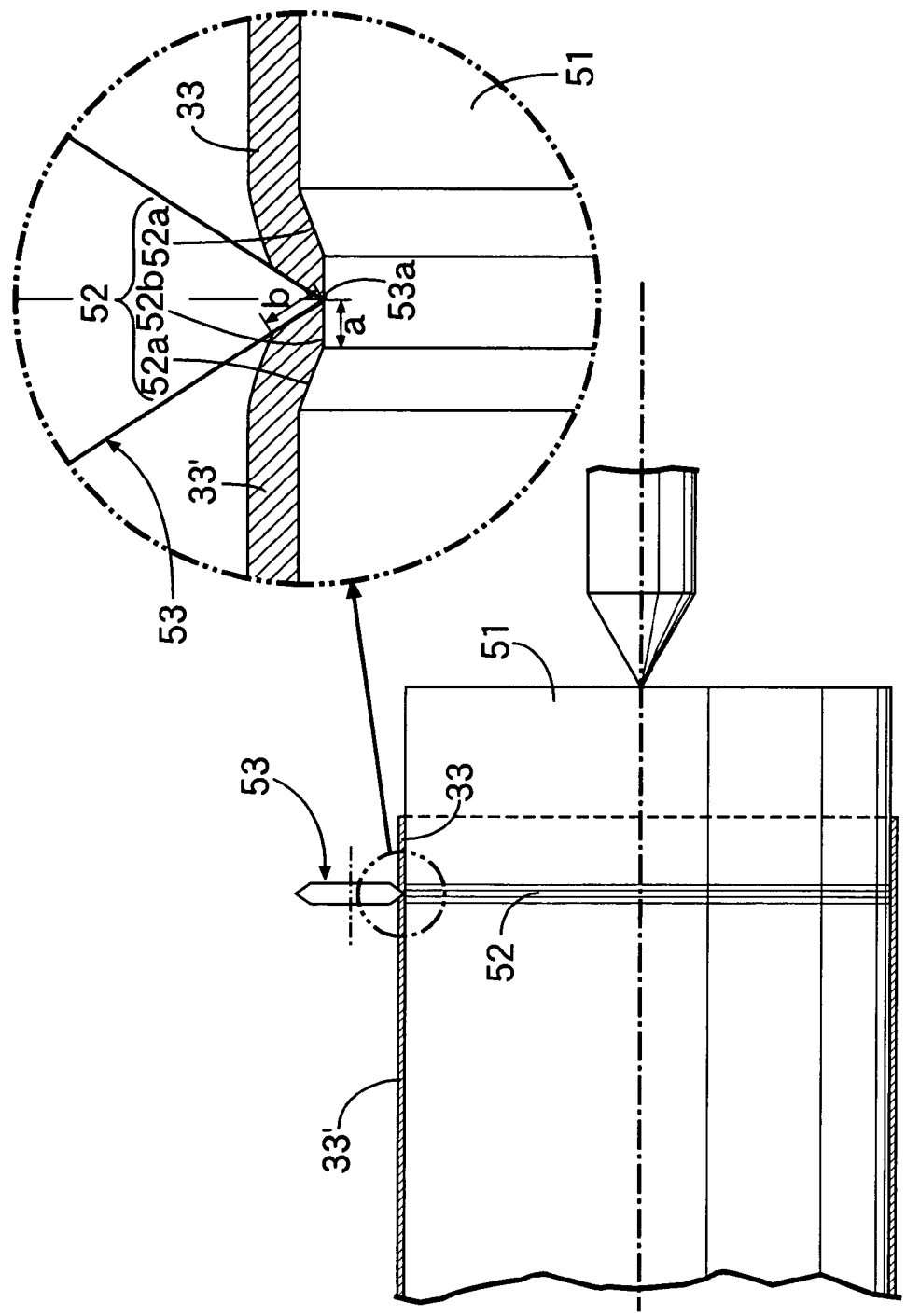
FIG. 3 is a side view of a process including a step of pushing/cutting for forming a metal ring along with an enlarged view of the process.
Figure 4A:
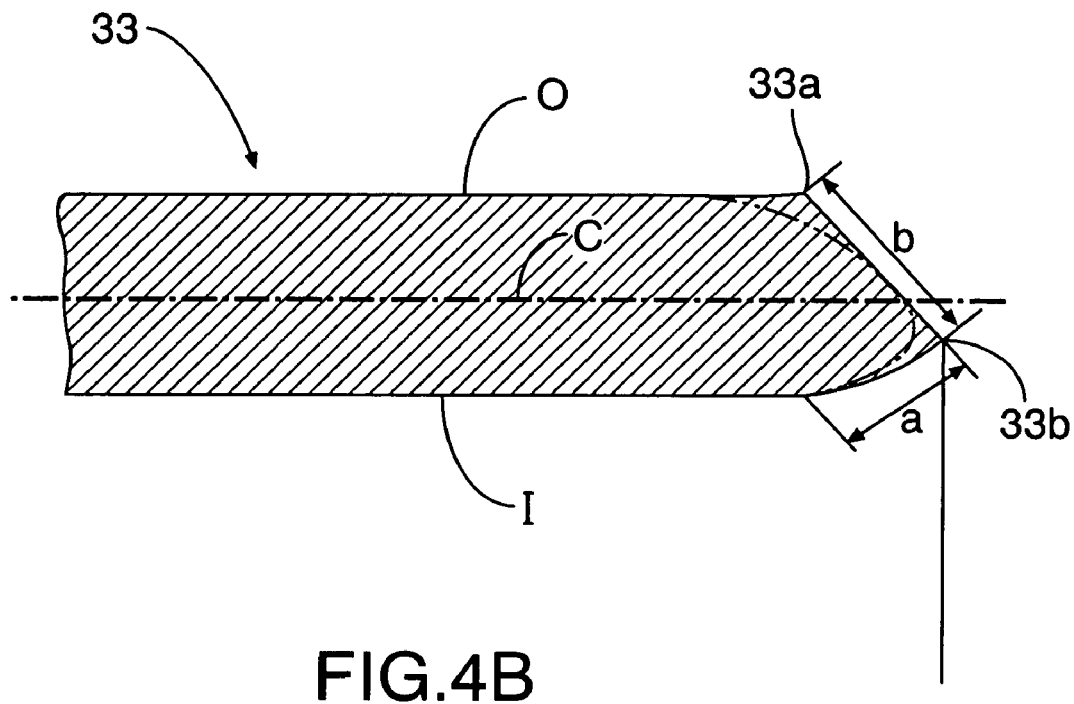
FIGS. 4A and 4B are diagrams of the metal ring showing, respectively, the metal ring formed by the pushing/cutting method and the metal ring after polishing.

As shown in FIG. 3, the metal ring 33 is produced by cutting a hollow cylindrical metal ring material 33' into circular slices of a predetermined width. More specifically, a circumferential groove 52, having a pair of inclined portions 52a, 52a and an equal-diameter portion 52b connecting the inclined portions 52a, 52a to each other, is formed in a surface of a mandrel 51. The metal ring material 33' is supported on an outer periphery of the mandrel 51. A rotating disk-shaped cutter 53 having an edge 53a that is triangular in section is pushed against an outer periphery of the metal ring material 33'. The metal ring material 33' is cut by a pushing/cutting method in cooperation between the circumferential groove 52 and the edge 53a. As shown in FIG. 4A, a side edge of the cut metal ring 33 is slightly curved in a radially outward direction, wherein two substantially flat faces a and b and two pointed edges 33a and 33b are formed on the metal ring 33.

Figure 4B:
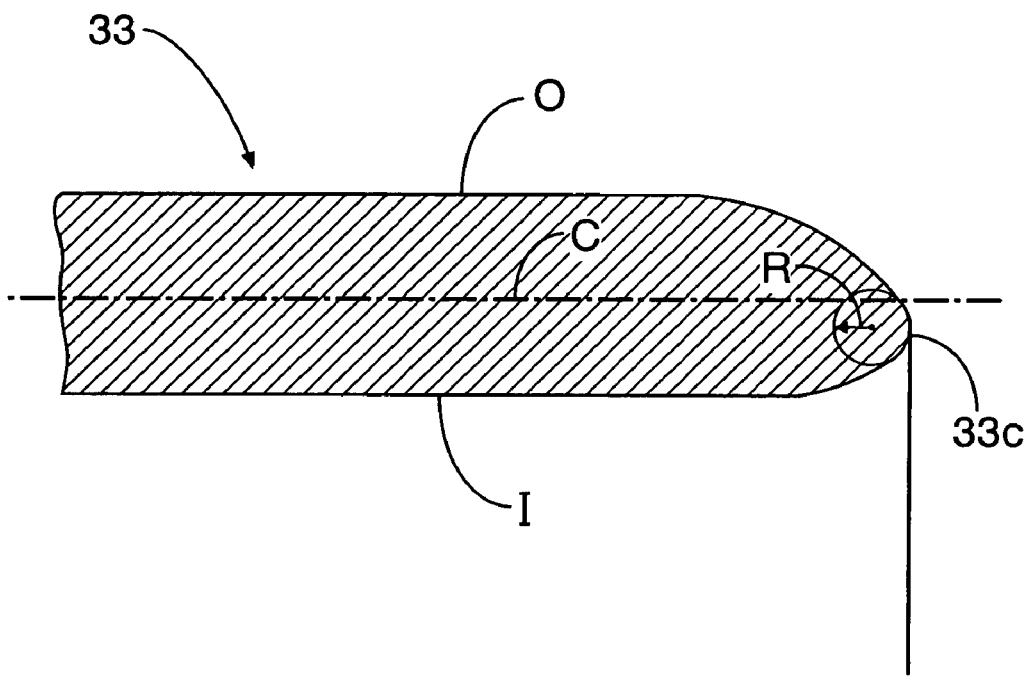

Subsequently, the side edge of the metal ring 33 is polished by a rotating brush containing abrasive grains, wherein the two pointed edges 33a and 33b are shaved off to form an arcuate projecting portion 33c having a predetermined radius R on the side edge of the metal ring 33, as shown in FIG. 4B. The projecting portion 33c is located between a radially central plane C and a radially inner peripheral surface I of the metal ring 33.

Figure 5A:
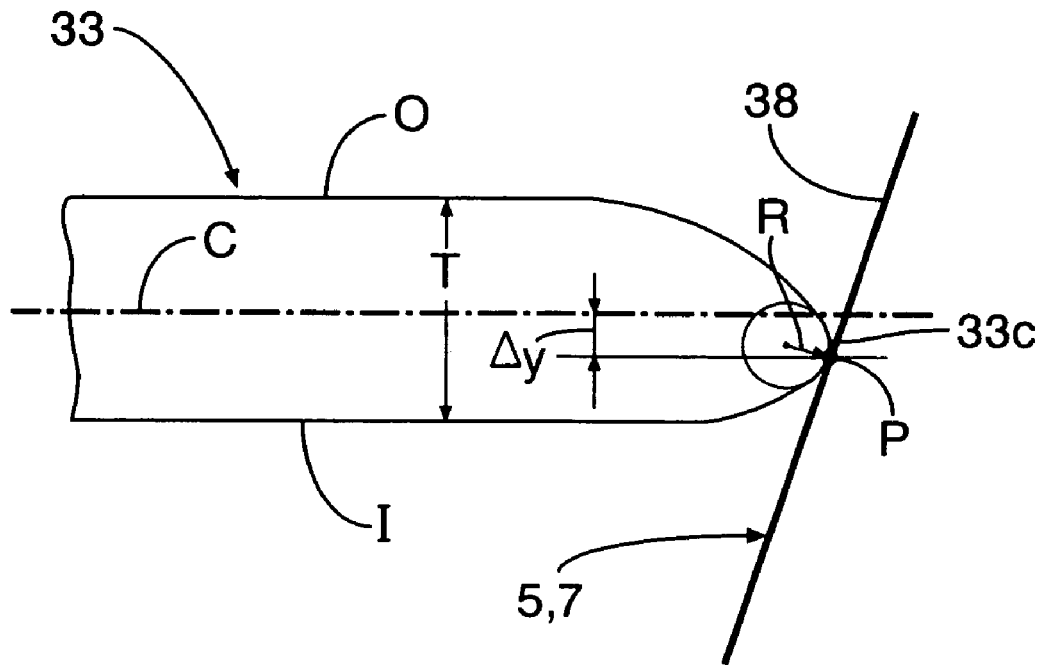
FIGS. 5A and 5B are diagrams showing, respectively, the metal ring of the present invention and a metal ring of a comparative example in a state in which each of the metal rings is abutting against a V-face of a pulley.
Figure 6A:
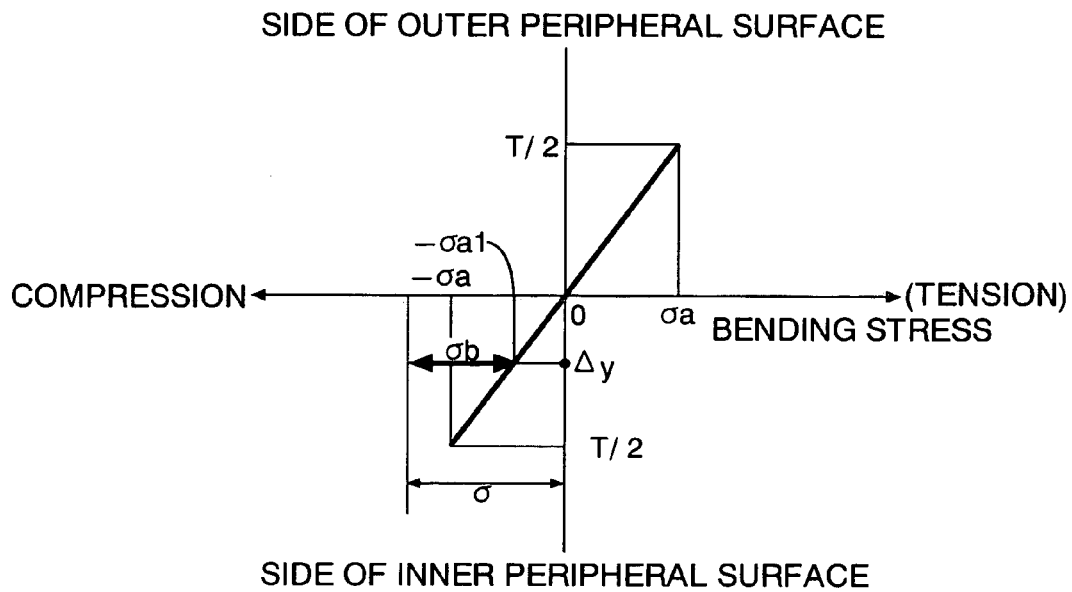
FIGS. 6A and 6B are graphs showing, respectively, stress applied to the metal ring of the embodiment and stress applied to the metal ring of the comparative example.
Figure 6B:
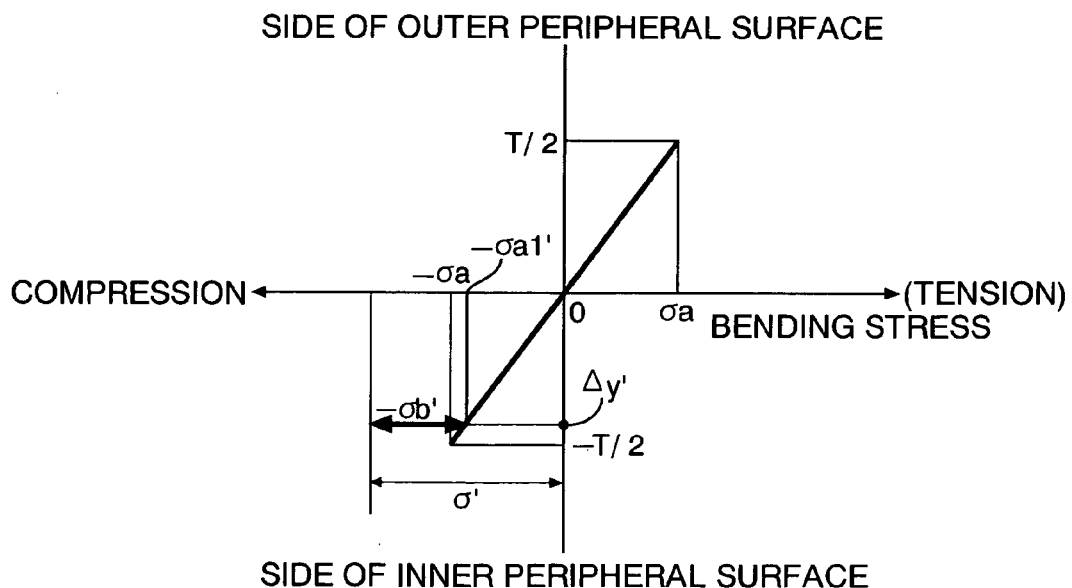

FIG. 5A shows a state in which the metal belt 9 is wound around the pulley 5, 7, and the side edge of the metal ring 33 is in contact with the V-face 38 of the pulley 5, 7. At this time, a contact point P between the projecting portion 33c of the side edge of the metal ring 33 and the V-face 38 of the pulley 5, 7 is displaced radially inward by a displacement distance $\Delta y$ from the radially central plane C of the metal ring 33. As shown in FIG. 6A, in the metal ring 33 wound and bent around the pulley 5, 7, the maximum tensile stress occurs when the radially outer peripheral surface O is tensioned to the maximum, the maximum compression stress occurs when the radially inner peripheral surface I is compressed to the maximum, and there is zero stress on the radially central plane C. Namely, the stress linearly changes from $\sigma a$ to $-\sigma a$ between the radially outer peripheral surface O and the radially inner peripheral surface I. A compression stress (a contact stress $-\sigma b$) due to the contact acts on the contact point P between the projecting portion 33c and the V-face 38 of the pulley 5, 7. Therefore, $|\sigma|=|-\sigma a1-\sigma b|$, which is a sum of a compression stress $|-\sigma a1|$, due to the bending and the contact stress $|-\sigma b|$, acts on the contact point P.

A metal ring 33 of a comparative example is produced by cutting, with a rotary grindstone, a cylindrical metal ring material 33' supported around an outer periphery of a mandrel. The metal ring 33 has a rectangular section after the cutting. When the metal ring 33 is subjected to barrel-polishing, radially outer and inner ends of a side edge of the metal ring 33 are ground, wherein two corner portions 33d, 33d, each having a radius R, are formed, as shown in FIG. 5B.

Figure 5B:
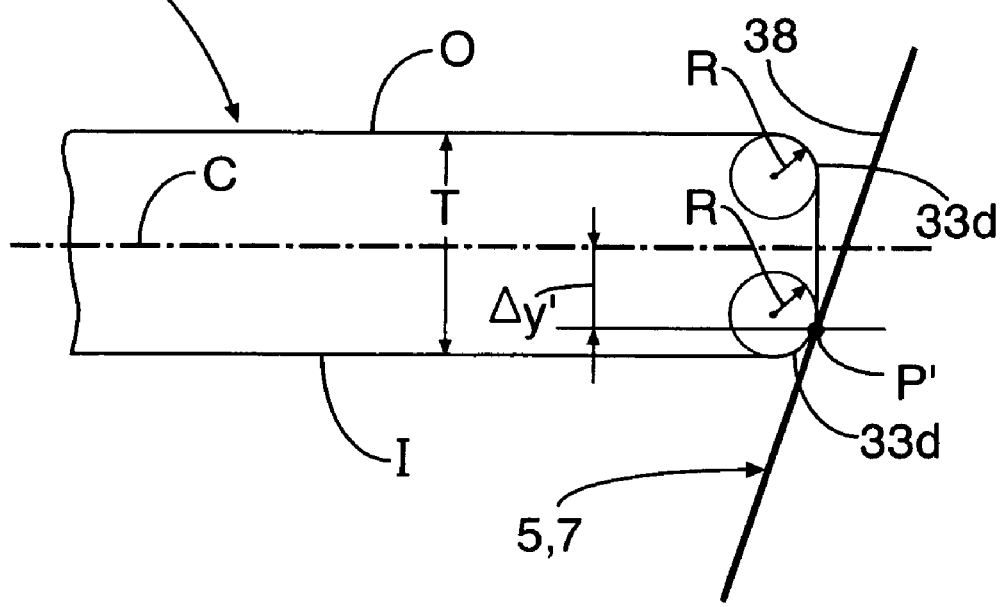

As shown in FIG. 5B, in the metal ring 33 of the comparative example, the radially inner corner portion 33d of the side edge is brought into contact with the V-face 38 of the pulley 5, 7 at a contact point P'. The position of the contact point P' at which the corner portion 33d is in contact with the V-face 38 of the pulley 5, 7 is displaced radially inward by a displacement distance $\Delta y'$ from a radially central plane C of the metal ring 33, and the displacement distance $\Delta y'$ is larger than the displacement distance $\Delta y$ in the embodiment of the present invention shown in FIG. 5A. Namely, the position of the contact point P' in the comparative example is nearer to a radially inner peripheral surface I of the metal ring 33, as compared with the position of the contact point P in the embodiment. Therefore, $|\sigma|=|-\sigma a1'-\sigma b'|$, which is a sum of a compression stress $|-\sigma a1'|$, due to the bending and a contact stress $|-\sigma b'|$, acts on the contact point P'.

If the radius R of the projecting portion 33 of the metal ring 33 of the embodiment is equal to the radius R of the corner portion 33d of the comparative example, both the contact stresses $|-\sigma b|$ and $|-\sigma b'|$ are equal to each other. However, because the positions of the contact points P and P' are different from each other, the compression stress $|\sigma a1|$, due to bending at the contact point P in the embodiment, is smaller than the compression stress $|\sigma a1'|$ due to bending at the contact point P' in the comparative example. Therefore, the total compression stress $|\sigma|=|-\sigma a1-\sigma b|$ at the contact point P in the embodiment is smaller than the total compression stress $|\sigma'|=|-\sigma a1'-\sigma b'|$ at the contact point P' in the comparative example.

As described above, in the metal ring 33 of the embodiment, the total compression stress in consideration of the contact stress at the contact point P is decreased, which enhances the durability against repeated bending. Moreover, the metal rings 33, each having a desired shape at the side edge, are produced accurately and with good efficiency by conducting the pushing/cutting and polishing steps.

Figure 7:
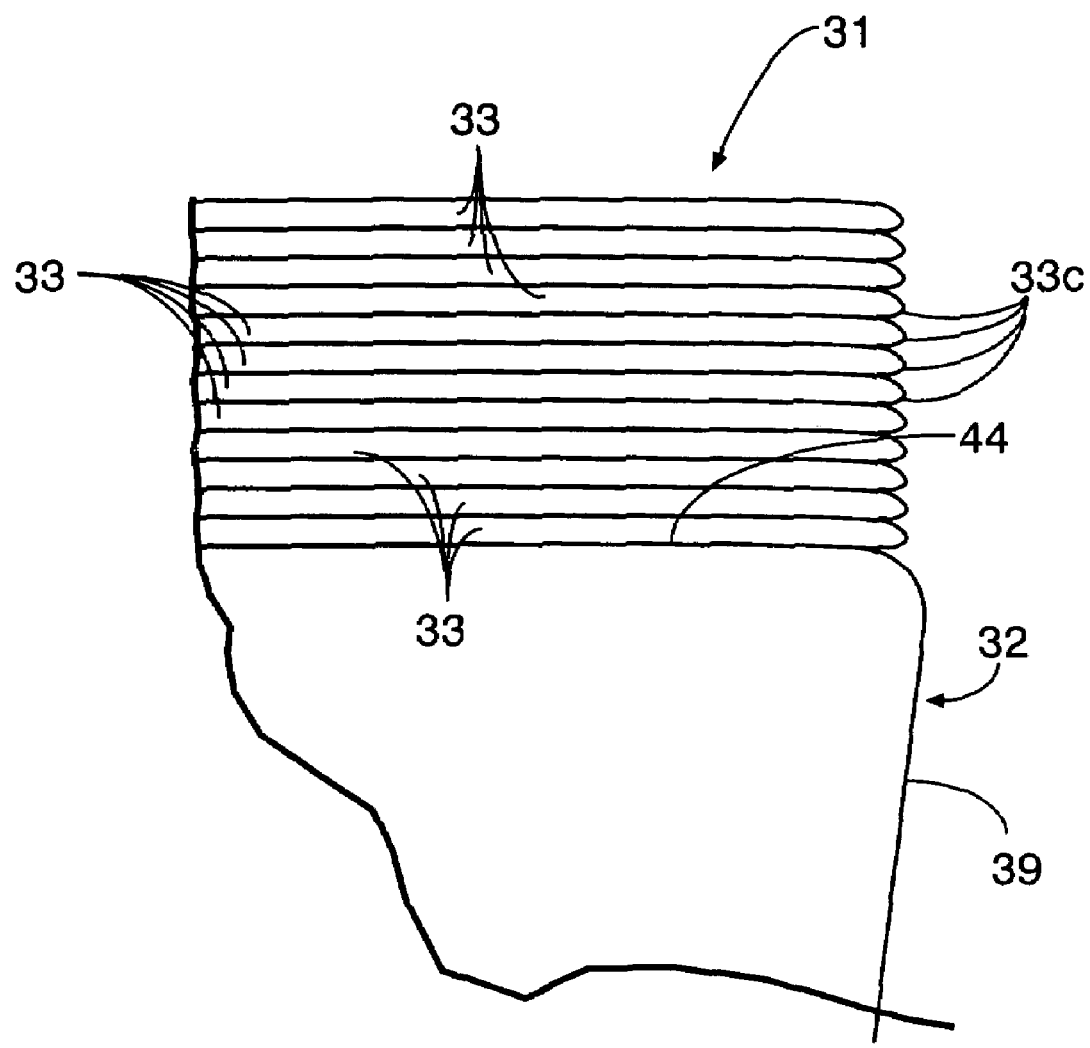
FIG. 7 is an enlarged view of an end of a metal ring assembly.

As apparent from FIG. 7, in the side edge of the metal ring assembly 31 comprising the plurality of metal rings 33 laminated on one another, oil is easily retained in recesses formed between the neighboring projecting portions 33c of the adjacent metal rings 33, thereby promoting the lubrication of sliding faces of the adjacent metal rings 33 and further enhancing the durability of the assembly 31. Moreover, the metal rings 33 in the laminated state are centered in a lateral direction by the saddle faces 44 of the metal elements 32 which have been subjected to the crowning. At the same time, the wider radially inner peripheral surface I of the overlying metal ring 33 covers the narrower radially outer peripheral surface O of the underlying metal ring and further enhances the centering function provided by crowning of the saddle faces 44.

A technique for inspecting whether the radius R of the projecting portion 33a of the finished side edge of the metal ring 33 is equal to a target value will be described below.

In the metal ring 33 of the present embodiment, the arcuate portion of the projecting portion 33a of the side edge having the radius R has a center angle of 60° ($\pi/6$), and hence the length L of the arcuate portion is equal to $R \times (\pi/6)$.

First, coordinates of the section of the side edge of the metal ring 33 are measured at a predetermined pitch p. A moving average of the coordinate is calculated at each of a plurality of (e.g., three) measurement points while changing the measurement point from one to another. FIG. 8 shows plotted coordinates of the moving averages m1, m2, m3, ... m17. If the moving averages m4 and m14 at locations nearest to opposite ends of the arcuate portion, and the moving average m9 at a location nearest to a center of the arcuate portion are determined, a radius R of a circle passing through the three moving averages m4, m9 and m14 is calculated, wherein it is possible to confirm whether the radius R is equal to the target value.

The pitch p between the adjacent moving averages from m1 to 17m is the same as the pitch p between the measurement points, and hence the number of intervals between the moving averages m4 to m14 included in the length L of the arcuate portion is calculated by dividing the length $L=R \times (\pi/6)$ of the arcuate portion by the pitch p. A reason why the moving averages m4 to m14 are selected is that the other moving averages outside the moving averages m4 to m14 provide errors since the other moving averages involve other curvature portions. In the embodiment, the number of the intervals is about 10, and hence, the radius R of the circle passing through the moving average m4, m9 and m14 can be calculated with a good accuracy by selecting the three moving averages m4, m9 and m14 with each five moving averages therebetween.

Particularly, by calculating the moving averages m1 to m17, an error in detecting the coordinate at each measurement point and influence of fine flaws on the projecting portion 33c of the metal ring 33 can be eliminated, thereby detecting the radius R of the arcuate portion of the projecting portion 33c with good accuracy.

Although the embodiment of the present invention has been described in detail, it will be understood that the present invention is not limited to the above-described embodiment, and various modifications may be made without departing from the spirit and scope of the invention defined in the claims.

For example, the radius R of the arcuate portion 33c of the metal ring 33 is calculated based on the three moving averages m4, m9 and m14 in the embodiment, but can be calculated based on four or more moving averages.

What is claimed is:

1. A continuously variable transmission metal belt comprising:
   a metal ring assembly including a plurality of endless metal rings laminated on one another; and
   a plurality of metal elements supported on the metal ring assembly,
   wherein each metal ring includes a side edge, a radially central plane, a radially inner peripheral surface and a radially outer peripheral surface, and wherein a lateral-most arcuate projecting portion, which is part of a circle having a predetermined radius, is formed at a tip end of the side edge and is disposed only between the radially central plane and the radially inner peripheral surface,
   wherein the side edge of the metal ring comprises a first transition region defined between the lateral-most arcuate projecting portion and the radially outer peripheral surface and a second transition region defined between the radially inner peripheral surface and the lateral-most arcuate projecting portion so that with said first and second transition regions, the side edge is formed to have a gradually reduced thickness in a direction extending toward the tip end, and
   wherein the circle having the predetermined radius is distanced from the radially inner peripheral surface toward a radially outer side and a length of the first transition region in a widthwise direction of the metal ring is longer than a length of the second transition region.

2. The continuously variable transmission metal belt according to claim 1, wherein the arcuate projecting portion has a center angle.

3. The continuously variable transmission metal belt according to claim 2, wherein the center angle is 60 degrees.

4. The continuously variable transmission metal belt according to claim 1, wherein the radially inner peripheral surface of an overlaying metal ring of the plurality of endless metal rings covers a radially outer peripheral surface of an underlying metal ring of the plurality of endless metal rings.

* * * * *